(12) United States Patent
Sangal

(10) Patent No.: US 10,484,755 B2
(45) Date of Patent: *Nov. 19, 2019

(54) ICONIZED VIDEO ADVERTISEMENT WALL

(71) Applicant: Excalibur IP, LLC, New York, NY (US)

(72) Inventor: Puneet Mohan Sangal, Bangalore (IN)

(73) Assignee: Excalibur IP, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/907,156

(22) Filed: Feb. 27, 2018

(65) Prior Publication Data

US 2018/0192162 A1 Jul. 5, 2018

Related U.S. Application Data

(63) Continuation of application No. 15/143,542, filed on Apr. 30, 2016, now Pat. No. 9,930,425, which is a (Continued)

(51) Int. Cl.
*H04N 21/81* (2011.01)
*G06Q 30/02* (2012.01)
(Continued)

(52) U.S. Cl.
CPC ....... *H04N 21/812* (2013.01); *G06Q 30/0275* (2013.01); *H04N 21/25891* (2013.01); *H04N 21/41415* (2013.01); *H04N 21/4312* (2013.01); *H04N 21/4532* (2013.01); *H04N 21/472* (2013.01); *H04N 21/4784* (2013.01); *H04N 21/6125* (2013.01)

(58) Field of Classification Search
CPC .......... H04N 21/812; H04N 21/25891; H04N 21/4312; H04N 21/4725; H04N 21/6125; H04N 21/4784; H04N 21/41415; H04N 21/472; H04N 21/4532; H04N 21/4335; G06Q 30/0277; G06Q 30/0275; H04H 60/375
USPC ......................................................... 725/34
See application file for complete search history.

(56) References Cited

U.S. PATENT DOCUMENTS 6,188,398 B1 2/2001 Collins-Rector et al.
6,282,713 B1 8/2001 Kitsukawa et al.
(Continued)

*Primary Examiner* — Cynthia M Fogg
(74) *Attorney, Agent, or Firm* — Mauriel Kapouytian Woods LLP; Serge Krimnus; James Woods

(57) ABSTRACT

Methods and systems are provided that can include iconization and later play of video content items, such as advertisements. During presentation of an online video, video advertisements may be presented. Upon user selection, during or after presentation of a particular video advertisement, the advertisement may cease to be presented, but an icon may be displayed that represents the video advertisement. The icon may be displayed in an area adjacent to the online video display area, which area may include multiple icons. Later, upon user selection of the icon, the video advertisement may be played, or may continue playing, utilizing local storage of the video advertisement. This, in turn, may provide, for example, efficient, convenient user access to the video advertisement, leading to enhanced advertisement performance with minimal intrusive impact on the user experience as a whole.

24 Claims, 12 Drawing Sheets

Related U.S. Application Data continuation of application No. 14/095,747, filed on Dec. 3, 2013, now Pat. No. 9,369,778, which is a continuation-in-part of application No. 13/786,729, filed on Mar. 6, 2013, now abandoned.

(51) Int. Cl.
*H04N 21/414* (2011.01)
*H04N 21/258* (2011.01)
*H04N 21/431* (2011.01)
*H04N 21/45* (2011.01)
*H04N 21/472* (2011.01)
*H04N 21/4784* (2011.01)
*H04N 21/61* (2011.01)

(56) References Cited

U.S. PATENT DOCUMENTS

| | | |
|---|---|---|
| 9,055,348 B1 | 6/2015 | Kerns et al. |
| 9,369,778 B2 | 6/2016 | Sangal |
| 9,930,425 B2 | 3/2018 | Sangal |
| 2002/0138831 A1 | 9/2002 | Wachtfogel et al. |
| 2003/0028885 A1 | 2/2003 | Wilcox et al. |
| 2003/0226141 A1 | 12/2003 | Krasnow et al. |
| 2007/0130015 A1 | 6/2007 | Starr et al. |
| 2007/0266403 A1 | 11/2007 | Ou et al. |
| 2008/0276272 A1 | 11/2008 | Rajaraman et al. |
| 2009/0076909 A1 | 3/2009 | Ioffe |
| 2009/0210899 A1 | 8/2009 | Lawrence-Apfelbaum et al. |
| 2011/0307920 A1* | 12/2011 | Blanchard .......... H04N 21/4431 725/32 |
| 2012/0290979 A1 | 11/2012 | Devecka |
| 2014/0259055 A1 | 9/2014 | Sangal |

* cited by examiner

ICONIZED VIDEO ADVERTISEMENT WALL

RELATED APPLICATION

This application is a continuation of U.S. application Ser. No. 15/143,542, filed Apr. 30, 2016, which is a continuation of U.S. application Ser. No. 14/095,747, filed Dec. 3, 2013 (now U.S. Pat. No. 9,369,778), which is a continuation-in-part of U.S. application Ser. No. 13/786,729, filed Mar. 6, 2013. The entire contents of these applications are hereby incorporated herein by reference.

BACKGROUND

Video content, including online videos, as well as video content items, such as, for example, video advertisements, continue to increase in use and importance. It is often desired, for example, that video content items or video advertisements be, among other things, high-performance, yet with minimal intrusiveness or negative impact on user experience as a whole.

Figure 1:
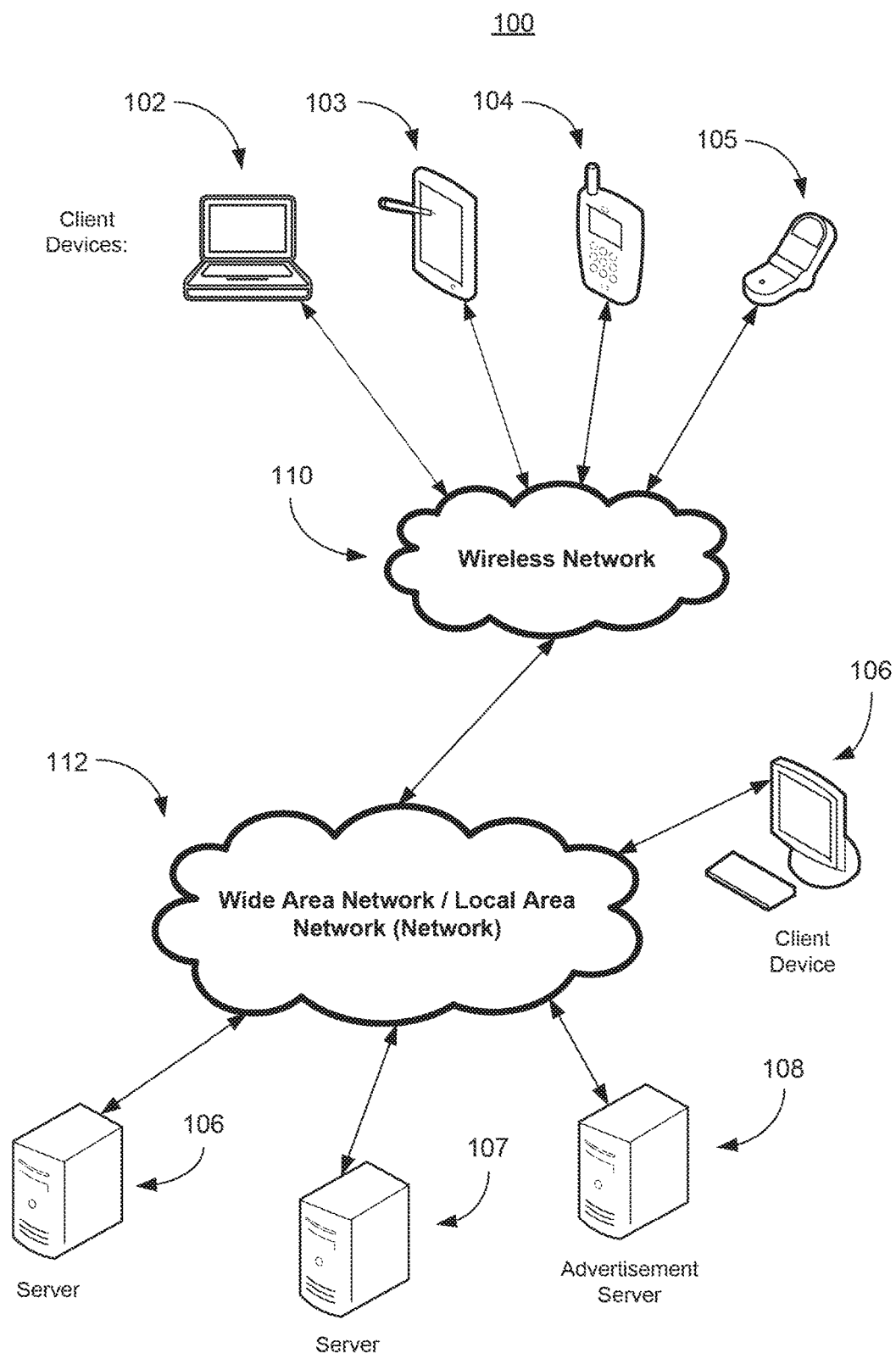
FIG. 1 illustrates a block diagram of a distributed computer system that can implement one or more aspects of a video advertisement iconization system or method according to one embodiment of the invention.

While the invention is described with reference to the above drawings, the drawings are intended to be illustrative, and the invention contemplates other embodiments within the spirit of the invention.

DETAILED DESCRIPTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" includes plural references. The meaning of "in" includes "in" and "on."

It is noted that description herein is not intended as an extensive overview, and as such, concepts may be simplified in the interests of clarity and brevity.

Some embodiments of the invention provide methods and systems that can include iconization of video content items, such as video advertisements. For example, in some embodiments, during presentation of an online video to a user, a number of video advertisements may be presented. For some, or each, of these, a user may be provided with an option to iconize the video advertisement, such as for later presentation, or later continued presentation. For example, a user may be viewing an online video, and during this, a video advertisement may begin to be presented. The user may, for example, be tempted by the advertisement, but may not wish to be interrupted from watching the online video. The user may be able, for example, to click on the advertisement, or an associated button or option, so that the video advertisement stops showing, allowing the user to continue watching the online video without interruption or distraction. However, in place of the video advertisement, an icon representing the video advertisement may be displayed, and may continue to be displayed, such as in an area adjacent to the online video display. Later, such as after the online video is finishes, or if the user chooses to take a break from it, the user can, for example, select the icon to watch the associated video advertisement, whether from the start or perhaps where the user left off before iconizing the video advertisement. However, in some embodiments, video advertisements, or some of them, may be automatically iconized, such as without other selection. In some embodiments, an icon may display for set or flexible period of time, which could include before, at the end of, or after the presentation of the online video, or may remain until some set event occurs or removes it, for example.

The icon may, broadly speaking, represent the advertisement, such as may include, for example, being designed to effectively remind the user of the video advertisement, or something about it, such as an associated offer, the associated brand, advertiser, product, type of product, etc. That way, the user may be more likely to, for example, remember and select the icon.

In some embodiments, any number of types of user selection are possible, such as, among other things, mouse or other selection object activation or clicking, mousing over or related actions, touch with a finger or pointer, such as on a mobile device or other device, eyeball tracking, etc.

In some embodiments, an advertiser, or advertisers, may for example, identify, configure, select, or provide particular icons to be associated with particular advertisements. This may, for example, be part of an advertisement campaign or management thereof. In some embodiments, one or more graphical user interfaces (GUIs) or Application Protocol Interfaces (APIs) may be provided to advertisers, for this or other purposes.

Furthermore, in some embodiments, iconized or iconizable advertisements may be included as part of an auction-based online advertisement marketplace for advertisers (where "advertisers" can broadly include their representatives, proxies, agents, etc.). In some embodiments, particular bidding parameters or premiums may be charged for iconizable or iconized advertisements, which may be associated with higher anticipated performance of such advertisements. Furthermore, in some embodiments, customized bidding parameters or payment parameters may be utilized. For example, advertiser charges or payment may be associated, or partly associated, with parameters such as, for example, user interaction or time of interaction or presentation of the video advertisement, the associated icon, etc. Still further, in some embodiments, advertisers may be able to bid in connection with parameters associated with the iconizable advertisement, such as an associated online video or movie.

In some embodiments, iconizable and iconized video advertisement performance is tracked and stored, for analysis and optimization of future advertising, which can include, for example, use of one or more feature-based or matrix-based machine learning techniques. Iconized and iconizable video advertisements may be targeted to users in many ways, such as profile-based, including demographic profiles, as well as, for example, emotional or psychographic profiles, behavior-based, social or social networking profiles or graphs, etc. In some embodiments, characteristics of users specifically in connection with or useful with reference with iconizable advertisements (such as past user behavior in this regard) or otherwise associated general user behavior (such as a user's past behavior in terms of being distracted from a video, for example), may be used.

In some embodiments, one or more GUIs or APIs may also be provided to users, such as to enable configuration or customization of parameters associated with iconization of video advertisements.

In some embodiments, if a user selects an icon, an online video that the user is watching may automatically, such as without user action being needed, be paused until presentation of the video advertisement associated with the icon ceases, and the online video may automatically then continue to be presented.

In some embodiments, a video advertisement area or bar, or video advertisement wall, may be included. For example, in some embodiments, an area may be provided for a group of icons, such as an area substantially adjacent to the online video display area. This may help draw the user's attention to this area, while not interfering with the viewing of the online video.

In some embodiments, the icon display area may be limited, such as to a maximum area or a maximum number of icons, such as, for example, five icons. The area or number may be determined to be anticipated to provide maximal performance overall. In some embodiments, when new icons are displayed, previously presented icons may be removed, such as, for example, on a first in, first out basis, or in some other way. In some embodiments, icons may cycle or move around within the display area in various ways, including being positioned or moved to as to increase or optimize performance, according to, or partly according to, advertising bidding or anticipated marketmaker profit, etc. Furthermore, distribution in time of iconizable advertisements, and time of display of icons, may be configurable, such as designed to optimize performance.

In some embodiments, icons may be of various sizes. In some embodiments, icons may be much smaller than the associated video advertisement.

While described largely in connection with video (which term, as used herein, is intended to be interpreted broadly), such as online videos, video content items, and video advertisement, some embodiments of the invention are used, or also used, in connection with non-video or not just video, content, advertisements, etc.

Herein, the terms "display", "presentation" and "play" are intended to be broadly interpreted to include any form of display, presentation, or serving, which can, for example include visual and/or audio presentation.

FIG. 1 illustrates components of one embodiment of an environment in which a system according to some embodiments of the invention, such as may be generally and non-exclusively, and in a non-limiting way, described as an iconizable content items system or video advertisement iconization system, may be practiced. Not all of the components may be required to practice the invention, and variations in the arrangement and type of the components may be made without departing from the spirit or scope of the invention. As shown, the system 100 includes one or more local area networks ("LANs")/wide area networks ("WANs") 112, one or more wireless networks 110, one or more wired or wireless client devices 106, mobile or other wireless client devices 102-105, servers 106-107 and one or more advertisement servers 108, and may include or communicate with one or more data stores or databases. Various of the client devices 102-106 may include, for example, desktop computers, laptop computers, set top boxes, tablets, cell phones, smart phones, etc. The servers 106-107 can include, for example, one or more application servers, content servers, search servers, etc.

The system 100 also includes one or more advertisement servers 108. An advertisement server can include, for example, a computer server that has a role in connection with online advertising, such as, for example, in obtaining, storing, determining, configuring, selecting, ranking, retrieving, targeting, matching, serving and presenting online advertisements, including video content items, to users, such as on websites, in applications, and other places where users will see them.

Figure 2:
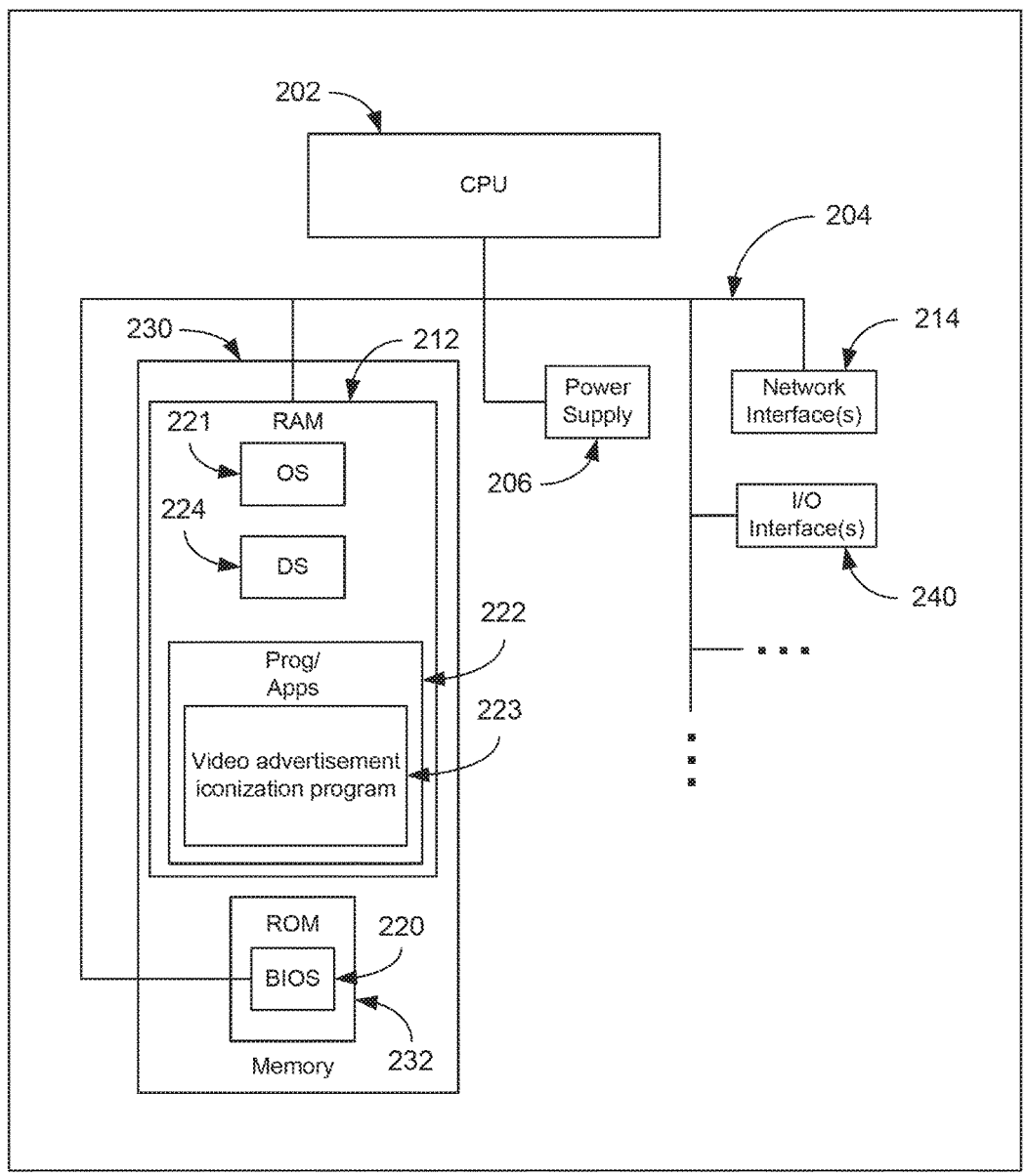
FIG. 2 illustrates a block diagram of an electronic device that can implement one or more aspects of a video advertisement iconization system or method according to one embodiment of the invention.

Elements of the system 100, which may include the servers 106-108 may include a Video Advertisement Iconization Program, as depicted, for example, in FIG. 2.

FIG. 2 illustrates a block diagram of an electronic device 200 that can implement one or more aspects of a Video Advertisement Iconization Program 223 (with the name being for reference and non-limiting), according to one embodiment of the invention. Instances of the electronic device 200 may include servers, e.g. servers 106-108, and client devices, e.g. client devices 102-106. In general, the electronic device 200 can include a processor 202, memory 230, a power supply 206, and input/output (I/O) components 240, e.g., microphones, speakers, displays, touchscreens, keyboards, keypads, GPS components, etc., which may be operable, for example, to provide graphical user interfaces. The electronic device 200 can also include a communications bus 204 that connects the aforementioned elements of the electronic device 200. Network interfaces 214 can include a receiver and a transmitter (or transceiver), and an antenna for wireless communications.

The processor 202 can include one or more of any type of processing device, e.g., a central processing unit (CPU). Also, for example, the processor can be central processing logic. Central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software controlled microprocessor, discrete logic, e.g., an application specific integrated circuit (ASIC), a programmable/programmed logic device, memory device containing instructions, etc., or combinatorial logic embodied in hardware. Furthermore, logic may also be fully embodied as software. The memory 230, which can include RAM 212 and ROM 232, can be enabled by one or more of any type of memory device, e.g., a primary (directly accessible by the CPU) or secondary (indirectly accessible by the CPU) storage device (e.g., flash memory, magnetic disk, optical disk). The ROM 232 can also include BIOS 220 of the electronic device.

The RAM can include an operating system 221, data storage 224, which may include one or more databases, and, among other things, programs or applications 222, which can include, for example, a Video Advertisement Iconization Program 223. The Program 223 is intended to broadly include or represent all programming, applications, algorithms, software and other tools necessary to implement or facilitate methods and systems according to embodiments of the invention, including embodiments in which iconized items are content items that are advertisements, as well as embodiments including content items that are not advertisements, and can include content items other than video. The elements of the Video Advertisement Iconization Program 223 may exist on a single server computer or be distributed among multiple computers or devices or entities, which can include advertisers, publishers, data providers, etc.

The power supply 206 contains one or more power components, and facilitates supply and management of power to the electronic device 200.

The input/output components, including I/O interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, and one or more input/output interfaces. A network care, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Video Advertisement Iconization Program 223, via a network to another device. Also, an application server may, for example, host a Web site that can provide a user interface for administration of example aspects of the Video Advertisement Iconization Program 223.

Any computing device capable of sending, receiving, and processing data over a wired and/or a wireless network may act as a server, such as in facilitating aspects of implementations of the Video Advertisement Iconization Program 223. Thus, devices acting as a server may include devices such as dedicated rack-mounted servers, desktop computers, laptop computers, set top boxes, integrated devices combining one or more of the preceding devices, etc.

Servers may vary in widely in configuration and capabilities, but they generally include one or more central processing units, memory, mass data storage, a power supply, wired or wireless network interfaces, input/output interfaces, and an operating system such as Windows Server, Mac OS X, UNIX, Linux, FreeBSD, etc.

A server may include, for example, a device that is configured, or includes a configuration, to provide data or content via one or more networks to another device, such as in facilitating aspects of an example Video Advertisement Iconization Program 223. One or more servers may, for example, be used in hosting a Web site, such as the Yahoo! Web site. One or more servers may host a variety of sites, such as, for example, business sites, informational sites, social networking sites, educational sites, wikis, financial sites, government sites, personal sites, etc.

Servers may also, for example, provide a variety of services, such as Web services, third-party services, audio services, video services, email services, instant messaging (IM) services, SMS services, MMS services, FTP services, voice or IP (VOIP) services, calendaring services, phone services, advertising services etc., all of which may work in conjunction with example aspects of an example Video Advertisement Iconization Program 223. Content may include, for example, text, images, audio, video, advertisements, etc.

In example aspects of the Video Advertisement Iconization Program 223, client devices may include, for example, any computing device capable of sending and receiving data over a wired and/or a wireless network. Such client devices may include desktop computers as well as portable devices such as cellular telephones, smart phones, display pagers, radio frequency (RF) devices, infrared (IR) devices, Personal Digital Assistants (PDAs), handheld computers, GPS-enabled devices tablet computers, sensor-equipped devices, laptop computers, set top boxes, wearable computers, integrated devices combining one or more of the preceding devices, etc.

Client devices, as may be used in an example Video Advertisement Iconization Program 223, may range widely in terms of capabilities and features. For example, a cell phone, smart phone or tablet may have a numeric keypad and a few lines of monochrome LCD display on which only text may be displayed. In another example, a Web-enabled client device may have a physical or virtual keyboard, data storage (such as flash memory or SD cards), accelerometers, gyroscopes, GPS or other location-aware capability, and a 2D or 3D touch-sensitive color screen on which both text and graphics may be displayed.

Client devices, such as client devices 102-106, for example, as may be used in an example Video Advertisement Iconization Program 223, may run a variety of operating systems, including personal computer operating systems such as Windows, iOS or Linux, and mobile operating systems such as iOS, Android, and Windows Mobile, etc. Client devices may be used to run one or more applications that are configured to send or receive data from another computing device. Client applications may provide and receive textual content, multimedia information, etc. Client applications may perform actions such as browsing webpages, using a web search engine, sending and receiving messages via email, SMS, or MMS, playing games (such as fantasy sports leagues), receiving advertising, watching locally stored or streamed video, or participating in social networks.

In example aspects of a Video Advertisement Iconization Program 223, one or more networks, such as networks 110 or 112, for example, may couple servers and client devices with other computing devices, including through wireless network to client devices. A network may be enabled to employ any form of computer readable media for communicating information from one electronic device to another. A network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and a telephone link.

A wireless network, such as wireless network 110, as in an example Video Advertisement Iconization Program 223, may couple devices with a network. A wireless network may employ stand-alone ad-hoc networks, mesh networks, Wireless LAN (WLAN) networks, cellular networks, etc.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, etc. Access technologies such as 2G, 2.5G, 3G, 4G, and future access networks may enable wide area coverage for client devices, such as client devices with various degrees of mobility. For example, wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, etc. A wireless network may include virtually any wireless communication mechanism by which information may travel between client devices and another computing device, network, etc.

Internet Protocol may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), wide area networks (WANs), wireless networks, and long haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

A "content delivery network" or "content distribution network" (CDN), as may be used in an example Video Advertisement Iconization Program 223, generally refers to a distributed computer system that comprises a collection of autonomous computers linked by a network or networks, together with the software, systems, protocols and techniques designed to facilitate various services, such as the storage, caching, or transmission of content, streaming media, video content, and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's Web site infrastructure, in whole or in part, on the third party's behalf.

A peer-to-peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Some embodiments include direct or indirect use of social networks and social network information, such as in targeted advertising or advertisement selection. A "social network" refers generally to a network of acquaintances, friends, family, colleagues, and/or coworkers, and potentially the subsequent connections within those networks. A social network, for example, may be utilized to find more relevant connections for a variety of activities, including, but not limited to, dating, job networking, receiving or providing service referrals, content sharing, creating new associations or maintaining existing associations with like-minded individuals, finding activity partners, performing or supporting commercial transactions, etc.

A social network may include individuals with similar experiences, opinions, education levels and/or backgrounds, or may be organized into subgroups according to user profile, where a member may belong to multiple subgroups. A user may have multiple "1:few" circles, such as their family, college classmates, or coworkers.

A person's online social network includes the person's set of direct relationships and/or indirect personal relationships. Direct personal relationships refers to relationships with people the user communicates with directly, which may include family members, friends, colleagues, coworkers, and the like. Indirect personal relationships refers to people with whom a person has not had some form of direct contact, such as a friend of a friend, or the like. Different privileges and permissions may be associated with those relationships. A social network may connect a person with other people or entities, such as companies, brands, or virtual persons. A person's connections on a social network may be represented visually by a "social graph" that represents each entity as a node and each relationship as an edge.

Users may interact with social networks through a variety of devices. Multi-modal communications technologies may enable consumers to engage in conversations across multiple devices and platforms, such as cell phones, smart phones, tablet computing devices, personal computers, televisions, SMS/MMS, email, instant messenger clients, forums, and social networking sites.

In some embodiments, an example Video Advertisement Iconization Program 223 can make use of various monetization techniques or models may be used in connection with contextual or non-search related advertising, as well as in sponsored search advertising, including advertising associated with user search queries, and non-sponsored search advertising, including graphical or display advertising, iconized and iconizable advertising, video advertising, etc. In an auction-based online advertising marketplace, advertisers may bid in connection with placement of advertisements, although many other factors may also be included in determining advertisement selection or ranking. Bids may be associated with amounts the advertisers pay for certain specified occurrences, such as for placed or clicked-on advertisements, for example. Advertiser payment for online advertising may be divided between parties including one or more publishers or publisher networks, and one or more marketplace facilitators or providers, potentially among other parties.

Some aspects of an example Video Advertisement Iconization Program 223 include advertising. Some models include guaranteed delivery advertising, in which advertisers may pay based on an agreement guaranteeing or providing some measure of assurance that the advertiser will receive a certain agreed upon amount of suitable advertising, and non-guaranteed delivery advertising, which may be individual serving opportunity-based or spot market-based. In various models, advertisers may pay based on any of various metrics associated with advertisement delivery or performance, or associated with measurement or approximation of a particular advertiser goal. For example, models can include, among other things, payment based on cost per impression or number of impressions, cost per click or number of clicks, cost per action for some specified action, cost per conversion or purchase, or cost based on some combination of metrics, which can include online or offline metrics. In some embodiments, payment may be based, or based in part, on parameters associated specifically with, or particularly relevant to, for example, iconized or iconizable advertising.

The process of buying and selling online advertisements may include or require the involvement of a number of different entities, including advertisers, publishers, agencies, networks, and developers. To simplify this process, some companies provide mutual organization systems called "ad exchanges" that connect advertisers and publishers in a unified platform to facilitate the bidded buying and selling of online advertisement inventory from multiple ad networks. "Ad networks" refers to companies that aggregate ad space supply from publishers and provide en masse to advertisers.

For Web portals, such as Yahoo!, advertisements may be displayed on web pages resulting from a user-defined search based upon one or more search terms. Such advertising is most beneficial to users, advertisers and web portals when the displayed advertisements are relevant to the web portal user's interests. Thus, a variety of techniques have been developed to infer the user's interests/intent and subsequently target the most relevant advertising to that user.

One approach to improving the effectiveness of presenting targeted advertisements to those users interested in receiving product information from various sellers is to employ demographic characteristics (i.e., age, income, sex, occupation, etc.) for predicting the behavior of groups of different users. Advertisements may be presented to each user in a targeted audience based upon predicted behaviors rather than in response to certain keyword search terms.

Another approach is profile-based ad targeting. In this approach, user profiles specific to each user are generated to model user behavior, for example, by tracking each user's path through a web site or network of sites, and then compiling a profile based on what pages and advertisements were delivered to the user. Using aggregated data, a correlation develops between users in a certain target audience and the products that those users purchase. The correlation then is used to target potential purchasers by targeting content or advertisements to the user at a later time.

During the presentation of advertisements, the presentation system may collect detailed information about the type of advertisements presented to the user. This information may be used for gathering analytic information on the advertising or potential advertising within the presentation. A broad range of analytic information may be gathered, including information specific to the advertising presentation system. Advertising analytics gathered may be transmitted to locations remote to the local advertising presentation system for storage or for further analysis. Where such advertising analytics transmittal is not immediately available, the gathered advertising analytics may be saved by the advertising presentation system until the transmittal of those advertising analytics becomes available.

Figure 3:
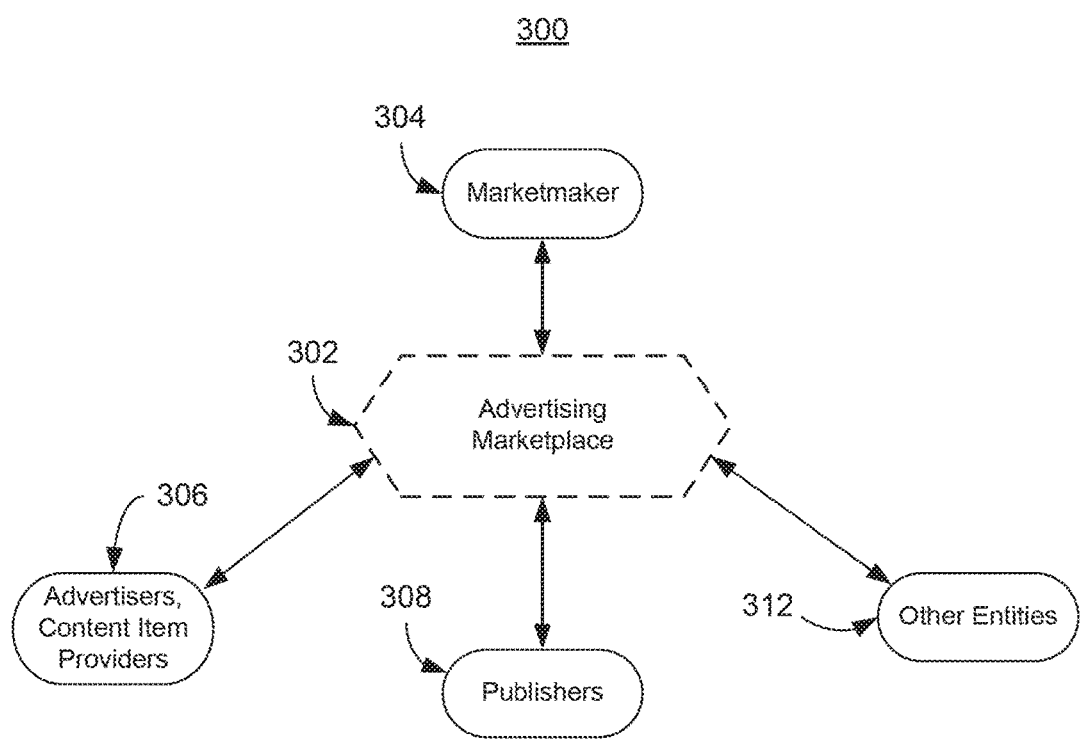
FIG. 3-7 illustrate block diagrams of a system that can implement one or more aspects of a video advertisement iconization system or method according to one embodiment of the invention.

FIG. 3 illustrates an example distributed system 300 in which aspects of some embodiments of the invention can be practiced (although all elements of the system are not necessary in practicing various elements or embodiments of the invention). The system 300 includes a marketmaker 304 and an advertising marketplace 302, which may, for example, be auction-based. Entities associated, directly or indirectly, with the marketplace 302 can include advertisers 306, publishers 308 and other entities 312, such as ad networks, data providers, partners, etc. In some embodiments, in or through this system or elements thereof, a marketmaker may offer, and advertisers may bid on and for, iconizable video advertisement opportunities.

Figure 4:
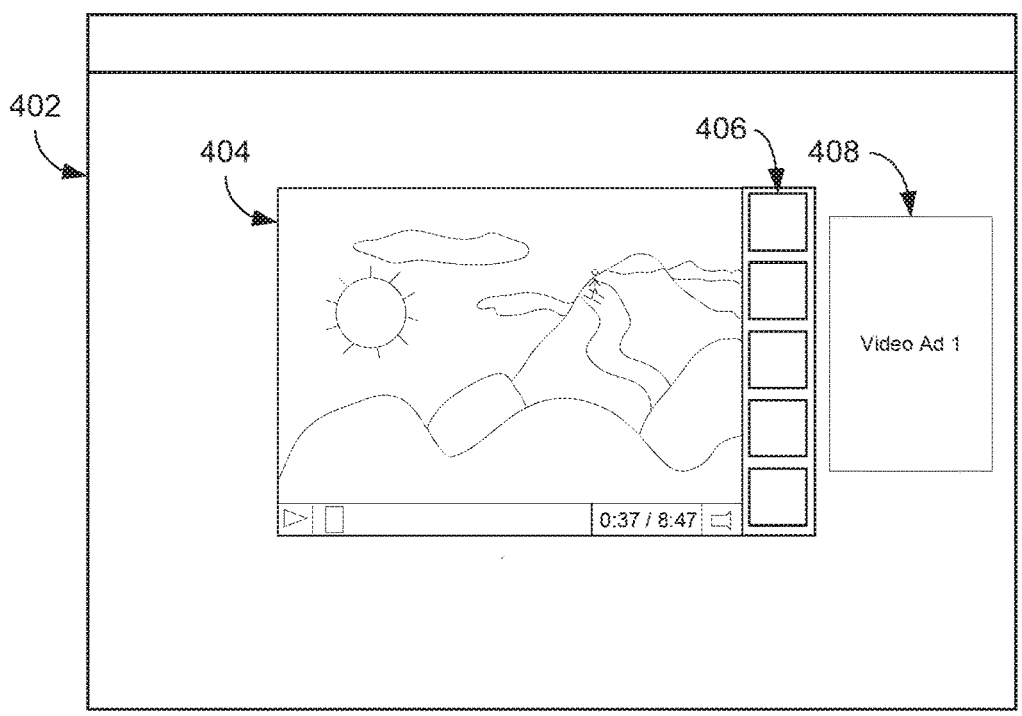

FIGS. 4-7 illustrates a series of simplified GUI screen shots, in accordance with some embodiments of the invention. As illustrated in FIG. 4, GUI 402, which can be or include a window, for example, includes an online video 404 that is being played or presented. Adjacent to the online video display area is a rectangular area 406, which is to serve as a display area for, potentially among other things, icons representing iconized video advertisements. As shown, the area 406 includes spots for 5 icons, which spots, when unfilled, may or may not be visible, and may or may not include other content or advertisements, or may be used for other purposes. As illustrated, during play of the online video 404, presentation or serving is initiated of a video advertisement, specifically, Video Ad 1 408 (in other embodiments, this could be a non-advertisement content item), which is an iconizable video advertisement. Video Ad 1 408 is shown adjacent to the icon display area, but could be displayed elsewhere, whether separate from, on, or partially overlapping with other screen content, which could, in some embodiments, include the online video.

Figure 5:
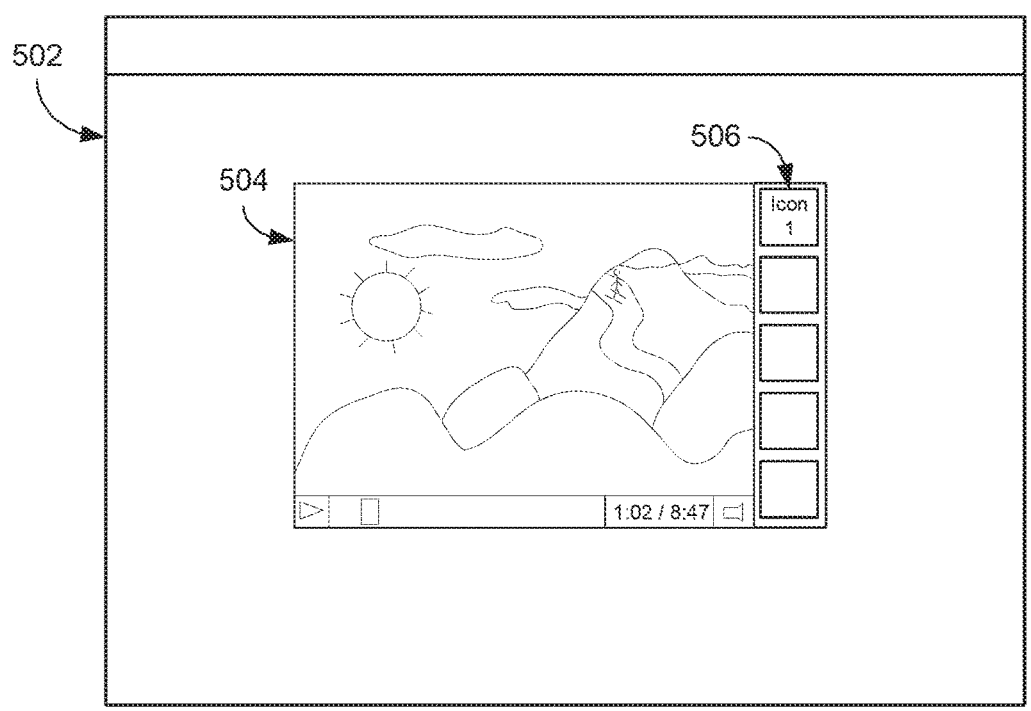

In FIG. 5, the online video 504 is at a later point in play than in FIG. 4. More specifically, in FIG. 5, Video Ad 1 408 has been iconized as an icon in the icon display area 506, specifically, Icon 1, which, broadly speaking, represents Video Ad 1 408. Video ad 1 408, itself, is no longer displayed. In some embodiments, upon or after iconization of Icon 1, the entire associated advertisement, Video Ad 1, is stored locally on the user device. In some embodiments, play or playback from such local storage can enable higher efficiency, faster, better display or user experience, etc., while not being inhibitive in terms of storage or storing, since only iconized advertisements are stored locally. In some embodiments, only a portion of an associated advertisement is stored. In some embodiments, a stored ad may be erased if an associated icon is no longer displayed.

However, in some embodiments, local storage is not done or utilized, and later selection of an icon may trigger remote serving or streaming of the associated video advertisement, for instance, which may or may not be different or made faster or more efficient using, for example, local or remote processing, preprocessing, formatting, loading, etc., in anticipation of potential later presentation.

In some embodiments, only some advertisements, or some video advertisements, are iconizable. As such, other advertisements may have been shown, but not iconized. In some embodiments, user selection of some sort is needed to iconize an iconizable advertisement, such as a user clicking on the advertisement, or an option or button to iconize the advertisement. However, in some embodiments, some or all iconizable advertisements may be iconized without user action, following complete or partial presentation thereof.

Figure 6:
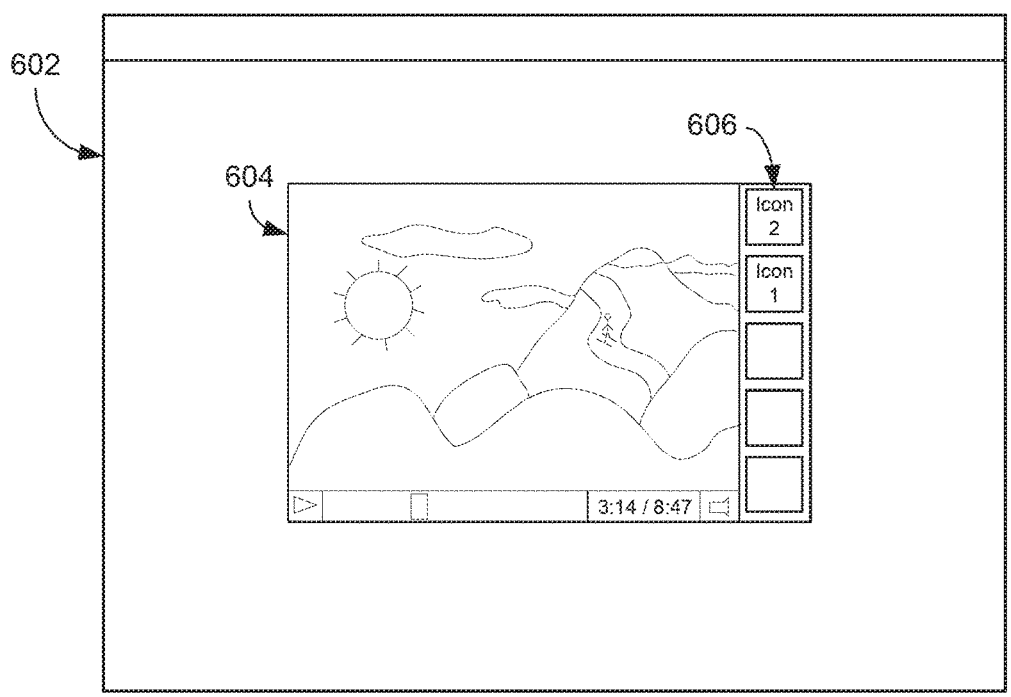

In FIG. 6, a still later point in the presentation of the online video 604 is illustrated. As depicted, another advertisement (not shown) has been iconized as Icon 2. Furthermore, Icon 1 has been moved to the next lower icon spot, and Icon 2 is displayed in the highest icon spot, where Icon 1 had previously been displayed.

Figure 7:
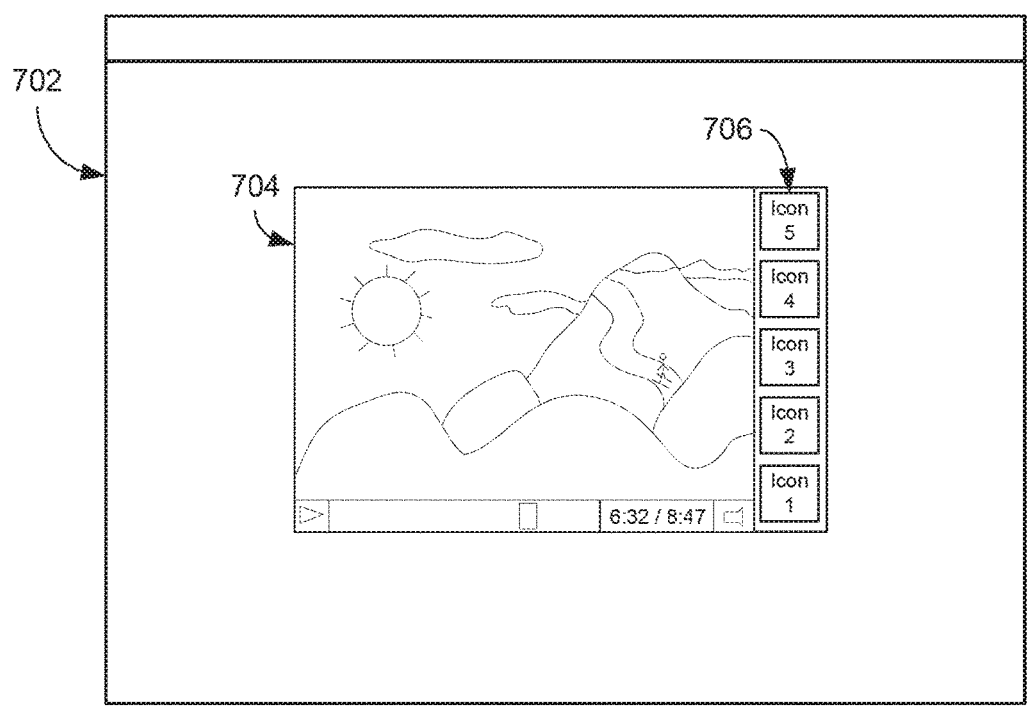

FIG. 7 represents a still later point in the presentation of the online video 704. By this point, several other video advertisements have been iconized, and now all five icon spots in the icon display area are filled with Icon 1-Icon 5. In some embodiments, if another icon is then displayed, it may appear in the highest spot, and the remaining icons would move down, except for Icon 1, which would disappear. However, of course, many other display possibilities and strategies exist. For example, in some embodiments, icons may be displayed for set periods of time, or for variable periods of time, depending on particular factors, such as user targeting, user behavior, calculated or anticipates associated video advertisement performance, profitability or quality, advertiser, marketmaker or user configuration, user profiling or targeting, etc. Furthermore, in some embodiments, icons may be moved around according to various factors or algorithms. In some embodiments, icons themselves may include animation, interactability beyond displaying an advertisement, or other features.

In some embodiments, once an icon, such as any of icons 1-5, is selected, the associated advertisement, or a portion thereof, may play. In some embodiments, the advertisement may begin presentation from from a point where it left off playing before being iconized, but in some embodiments, it may present from the start. In some embodiments, the advertisement may be altered or different, in format, content, or functionality, for example, when played from an icon, than when initially played.

In some embodiments, icons themselves may include video, movement, animation, rich media, size variability, or other aspects, which also may or may not depend upon various factors. In some embodiments, various factors may play a role, such as, for example, an associated advertiser or advertiser bidding, pricing, or advertiser configuration, a portion of the online video presently playing, characteristics of a presently playing portion of, the online video, subject matter of the online video, user targeting, etc.

Figure 8:
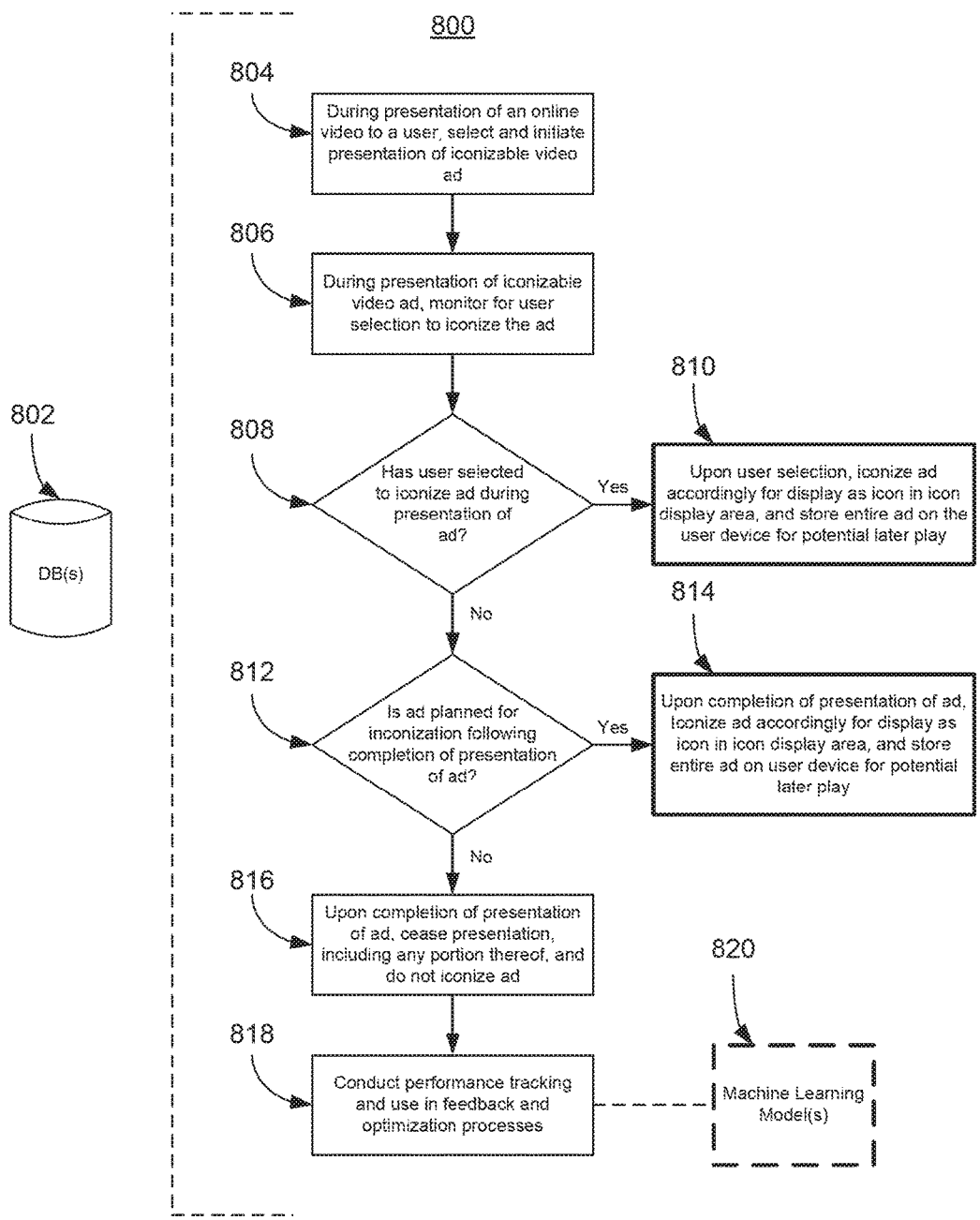
FIG. 8-9 illustrate flow diagrams of example operations of one or more aspects of a video advertisement iconization system or method according to one embodiment of the invention.

FIG. 8 illustrates a flow diagram of example operations 800 of one or more aspects of a video advertisement iconization system or method according to one embodiment of the invention. Data store(s) or database(s) 802 may be used in association with various of the steps depicted in FIG. 8.

At step 804, during presentation of an online video to a user, an iconizable video ad is selected, and presentation thereof is initiated, which can include serving or partial serving thereof.

At step 806, during presentation of the iconizable video ad, monitoring is performed for user selection to iconize the ad, which can include user clicking, mousing over, or other selection or action, on the ad itself, or on an associated button or other selectable item.

At step 808, it is queried whether the user has selected to iconize the ad, during presentation of the ad. If so, then, at step 810, upon user selection, the ad is iconized accordingly for display of an icon in the icon display area, and the entire ad is stored on the user device for potential later play.

If not, then, at step 812, it is queried whether the ad planned for iconization following completion of presentation of ad. If so, then, upon completion of presentation of ad, the ad is iconized accordingly for display as an icon in the icon display area, and the entire ad is stored on the user device for potential later play.

If not, then, at step 816, the ad is not iconized, following complete presentation of the ad, presentation is ceased, including display of any portion of the ad, and the ad is not iconized.

At step 818, performance tracking is conducted, such as of iconizable and iconized ads, and used in feedback and optimization processes, such as future ad targeting and selection optimization, ad configuration optimization, ad campaign or bidding optimization, etc., which may include use of one or more machine learning models 820.

Figure 9:
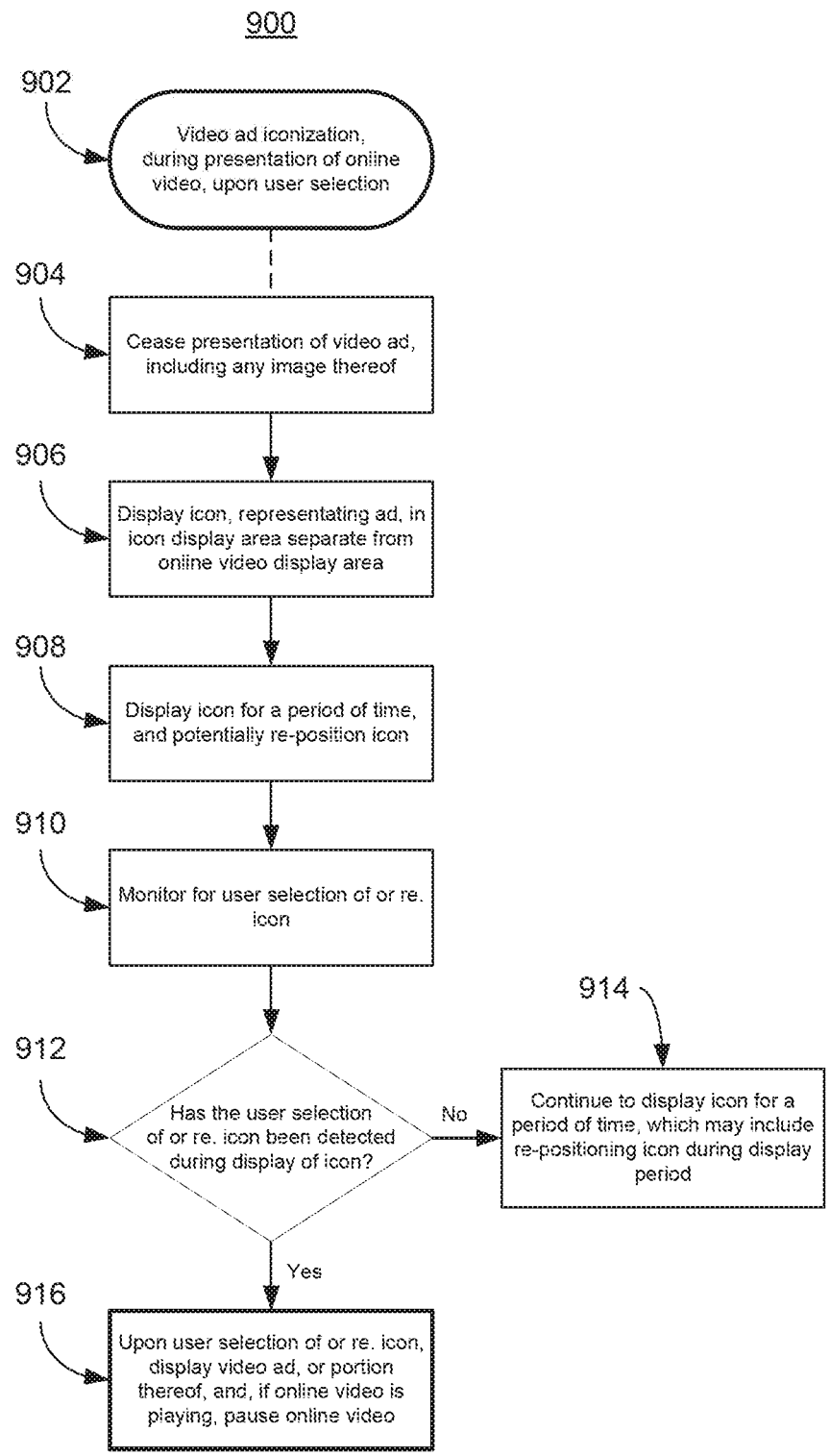

FIG. 9 illustrates a flow diagram of example operations 900 of one or more aspects of a video advertisement iconization system or method according to one embodiment of the invention.

Block 902 represents the method for video ad iconization, during presentation of an online video, upon user selection or planned, including steps 904-916.

At step 904, presentation of the video advertisement is ceased.

At step 906, the icon, representing ad, is displayed in the icon display area separate from an online video display area.

At step 908, the icon is displayed for some period of time, and may be re-positioned, such as in accordance with planning, such as configuration, one or more algorithms, etc.

At step 910, monitoring is performed for user selection of or regarding the icon, such as may trigger iconization.

At step 912, the method queries whether such user selection has been detected. If not, then, at step 914, the icon is presented for a period of time, which may include re-positioning of the icon during display period.

If user selection of the icon is detected, then, at step 916, the video ad is presented, or a portion thereof is presented, and, if the online video is playing, it is or may be paused. In some embodiments, the online video may at some point automatically continue being presented, such as without user action to cause re-starting, such as upon completion of presentation of the ad, completion of a user interaction with the ad, or user selection to discontinue presentation of or interactions with the ad and go back to watching the online video, for example.

Figure 10:
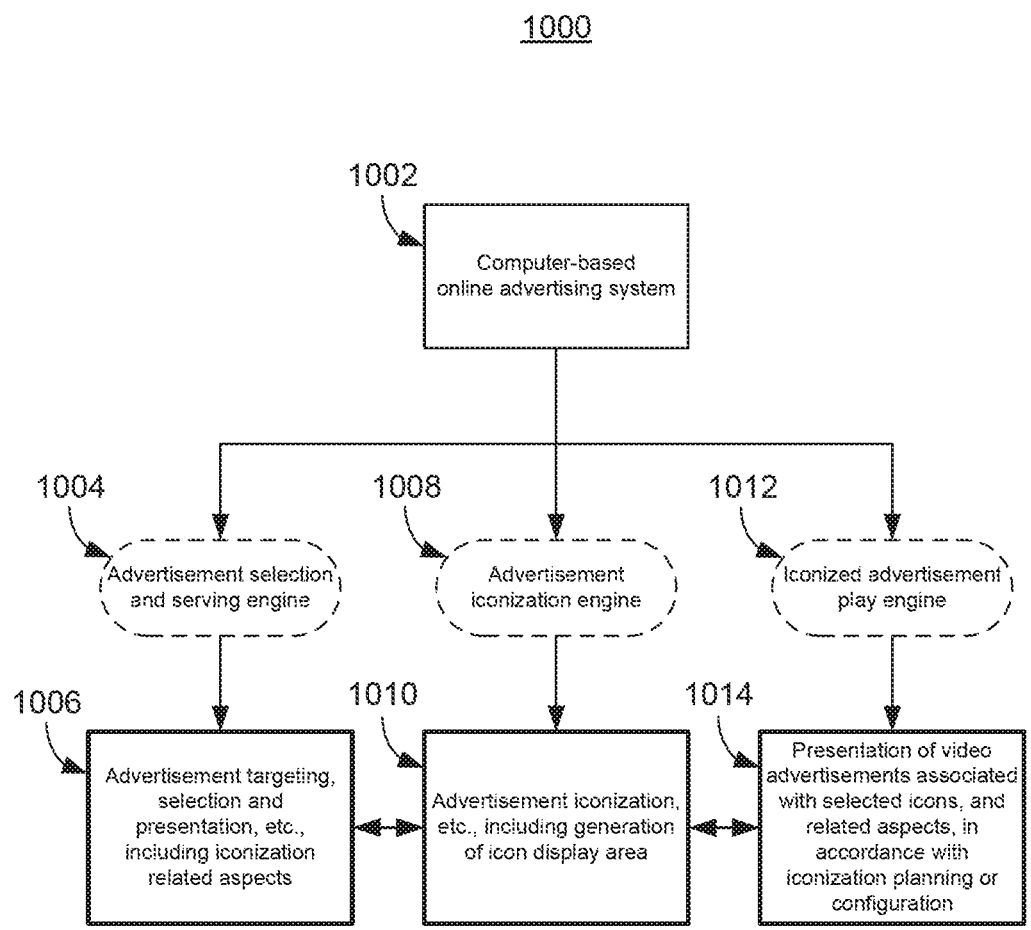
FIG. 10 illustrates a block diagram of a system that can implement one or more aspects of a video advertisement iconization system or method according to one embodiment of the invention.

FIG. 10 illustrates a block diagram of a system 1000 that can implement one or more aspects of a video advertisement iconization system or method according to one embodiment of the invention, which can include a computer-based online advertising system 1002.

The system 1002 includes or is used to implement several engines 1004, 1008, 1012. The engines 1004, 1008, 1012 may be, for example, program-based or software-based modules or conceptual units that may include programming, software, applications, etc., used in implementing or affecting aspects, functions or uses of some embodiments of the invention. Among other possibilities, the engines 1004, 1008, 1012 may be included in or implemented using one or more servers of the system 1002, including one or more processors and data stores or databases, or elements of the engines 1004, 1008, 1012 may be distributed among different systems, which could include, for example, advertiser or content item provider, publisher or other entity systems. In some embodiments, the various engines 1004, 1008, 1012, perhaps along with one or more other engines or other elements, may work together or in coordination to practice or implement methods or techniques according to embodiments of the invention.

The engines 1004, 1008, 1012 include an advertisement selection and serving engine 1004, that may be used for, among other things, as represented as step 1006, in advertisement targeting, selection and presentation, etc., including iconization related aspects. The engines 1004, 1008, 1012 may also include an advertisement iconization engine 1008, that may be used for, among other things, as represented as step 1010, in advertisement iconization and aspects related to or associated with advertisement iconization, which can include generation and management of an icon display area. The engines 1004, 1008, 1012 may further include an iconized advertisement play engine 1012, that may be used for, among other thing, as represented by step 1012, presentation of video advertisements associated with selected icons, and related aspects, such in accordance with iconization planning or configuration.

Figure 11:
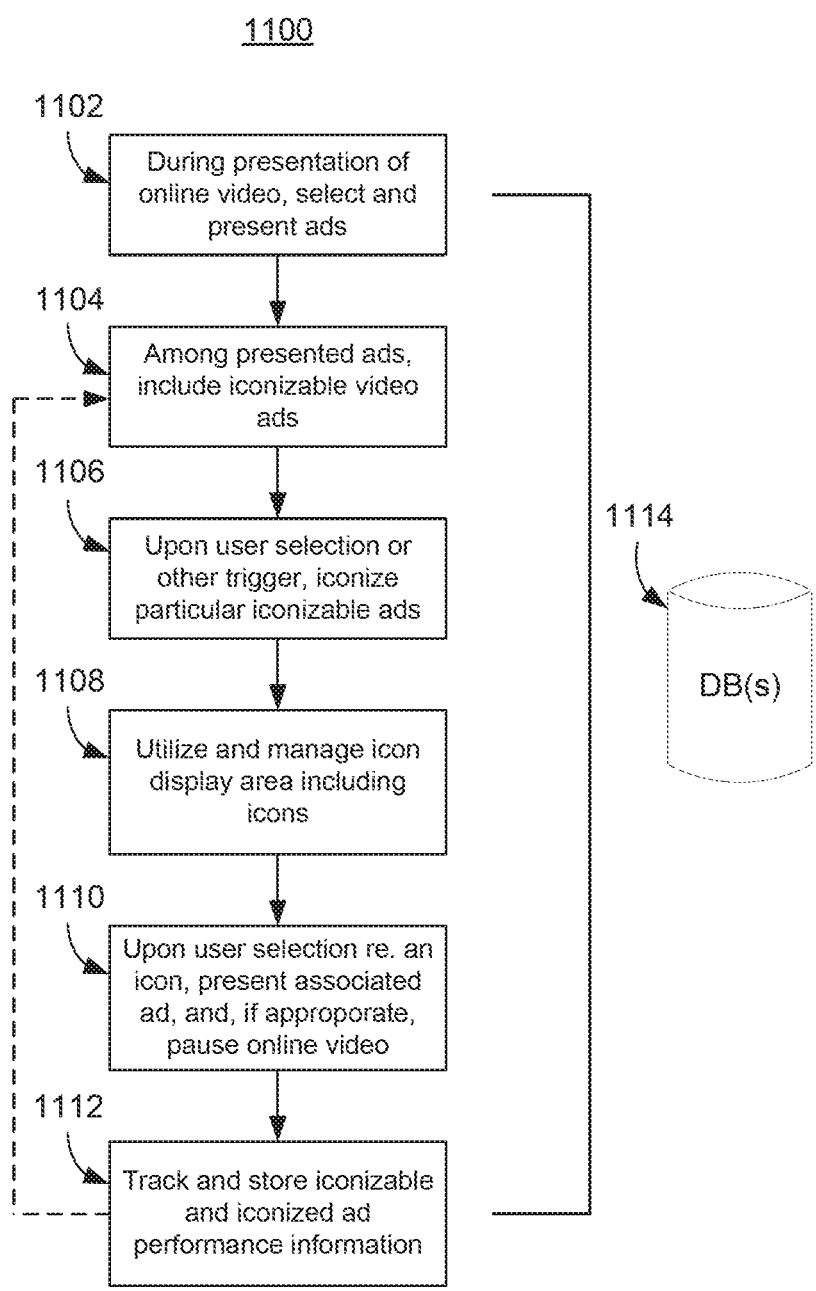
FIG. 11 illustrates a flow diagram of example operations of one or more aspects of a video advertisement iconization system or method according to one embodiment of the invention; and, FIG. 12 illustrates a block diagram of logic that can be used in implementing one or more aspects of a video advertisement iconization system or method according to one embodiment of the invention.

FIG. 11 illustrates a flow diagram of example operations 1100 of one or more aspects of a video advertisement iconization system or method according to one embodiment of the invention. Data from various steps may be stored or obtained from one or more data stores or databases, such as database(s) 1114.

Step 1102 represents, during presentation of an online video, selection and presentation of ads, which may include both non-iconizable and iconizable ads.

Step 1104 represents, among the presented ads, including iconizable advertisements. Furthermore, step 1106 represents, upon user selection or other trigger, iconization of particular iconizable ads. Still further, step 1108 represents formation or management of a display area including icons.

Step 1110 represents, upon user selection of or in association with an icon, presenting the associated ad, and, if configured accordingly, pausing the online video, if it is playing.

Step 1112 represents tracking and storing iconizable and iconized ad performance information, such as for later use in optimization of aspects of advertising or advertising campaign management, for example.

Figure 12:
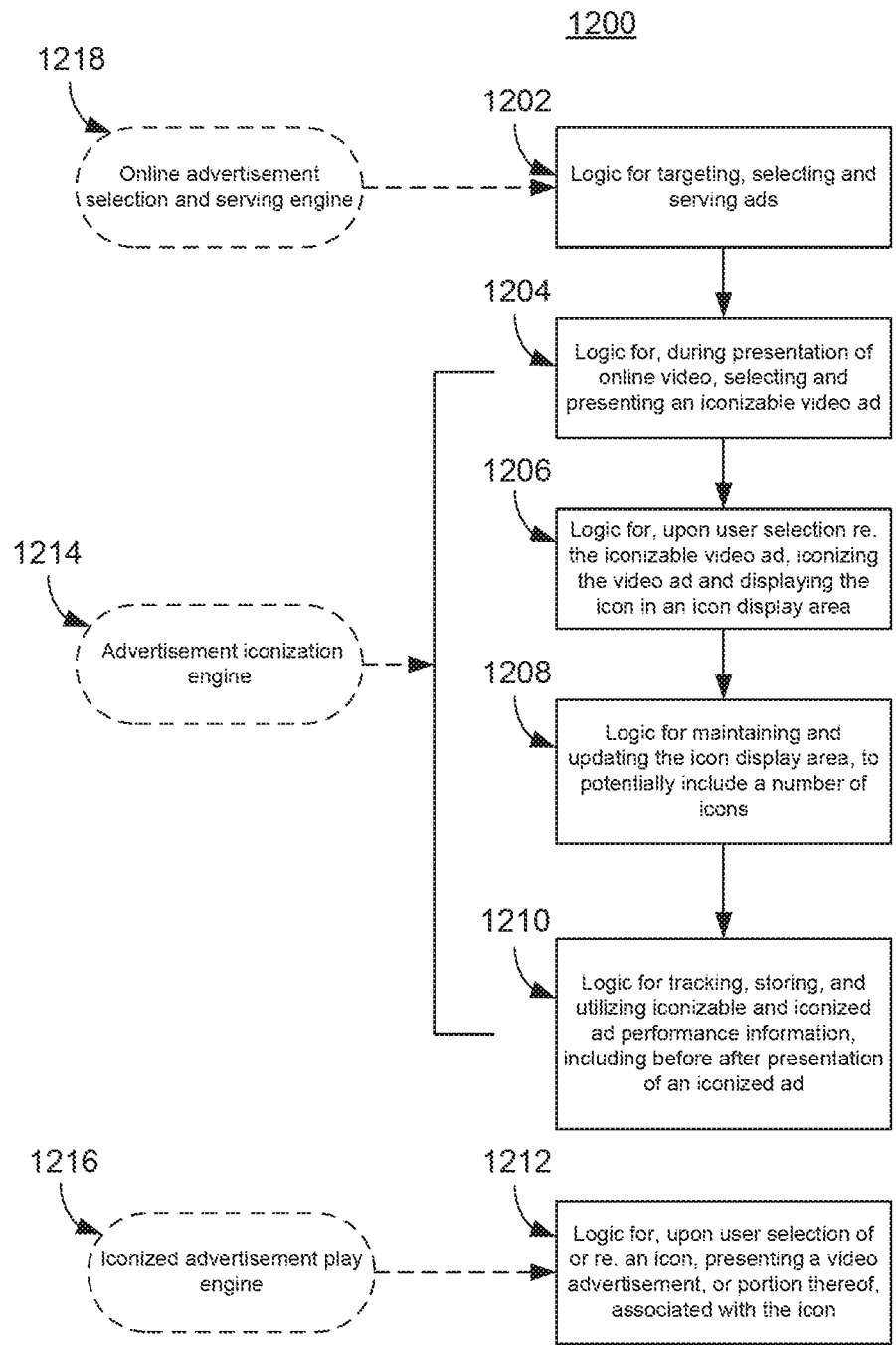

FIG. 12 illustrates logic 1200, such as software or programming based logic, that may be used to implement one or more aspects of a video advertisement iconization system or method according to one embodiment of the invention, such as may be elements of one embodiment of a Video Advertisement Iconization Program 223. As depicted, an online advertisement selection and serving engine 1218 or module may be used in providing logic for targeting, selecting and serving advertisements 1202.

Furthermore, an advertisement iconization engine 1214 or module, may be used in providing various logic. The engine 1214 may provide logic for, during presentation of online video, selecting and presenting an iconizable video ad 1204. The engine 1214 may further provide logic for, upon user selection re. the iconizable video ad, iconizing the video ad and displaying the icon in an icon display area 1206. The engine 1214 may also provide logic for maintaining and updating the icon display area, to potentially include a number of icons 1208. Still further, the engine 1214 may provide logic for tracking, storing, and utilizing iconizable and iconized ad performance information, including before after presentation of an iconized ad 1210.

Still further, a video advertisement play engine 1216 or module, may be used in providing various logic. The engine 1216 may provide logic for, upon user selection of or re. an icon, presenting a video advertisement, or portion thereof, associated with the icon 1212.

While the systems and methods have been described in terms of one or more embodiments, it is to be understood that the disclosure need not be limited to the disclosed embodiments. It is intended to cover various modifications and similar arrangements included within the scope of the claims, the scope of which should be accorded the broadest interpretations so as to encompass all such modifications and similar structures.

The invention claimed is:

1. A system comprising one or more processors and a non-transitory storage medium comprising program logic for execution by the one or more processors, the program logic comprising:
  an advertisement iconization engine that, during presentation of an online video to a user, for each video advertisement of a set of video advertisements presented, at least in part, to the user on a device of the user, after presentation of at least a portion of a duration of the video advertisement and upon a first selection of the user:
    ceases presentation of the video advertisement, including display of any portion thereof;
    in a first display area outside of a display area of the online video, causes display of an icon, representing the video advertisement and provided or selected by an advertiser, in an icon spot among other displayed icons, representing other video advertisements, in other icon spots, wherein the display of the icon in an icon spot is based at least in part on one of a determined period for displaying the icon and a characteristic of the online video; and causes storage of at least a portion of the video advertisement on the device of the user while the icon is displayed in an icon spot, and erasure of one or more of the set of video advertisements from storage on the device of the user when an associated icon is no longer displayed in one of the icon spots.

2. The system of claim 1, further comprising:
configuring an iconized advertisement play engine to, upon user selection of the icon and utilizing storage of the video advertisement on the device of the user, initiate a presentation that includes playing at least a portion of the video advertisement.

3. The system of claim 2, wherein the iconized advertisement play engine is configured to start, as determined by the advertiser, the presentation from one of a point where the video advertisement left off playing before being iconized, a beginning of the video advertisement, or a beginning of an altered version of the video advertisement.

4. The system of claim 2, wherein the iconized advertisement play engine, during presentation of the online video, upon the user selection of the icon, is configured to cause pausing of presentation of the online video and initiates presentation of at least a portion of the video advertisement.

5. The system of claim 1, wherein the determined period for displaying the icon is based at least in part on one or more of user targeting, user behavior, calculated or anticipated associated video advertisement performance, calculated or anticipated associated video advertisement profitability, calculated or anticipated associated video advertisement quality, an advertiser configuration, a market-maker configuration, a user configuration and user profiling.

6. The system of claim 1, wherein the advertisement iconization engine, upon the user selection, further causes storage of the video advertisement, in its entirety, on the device of the user.

7. The system of claim 1, further comprising:
an advertisement selection and serving engine that selects and initiates serving of each video advertisement of the set of video advertisements to the user.

8. The system of claim 1, wherein the other displayed icons are selected by one or more other advertisers.

9. The system of claim 1, wherein the video advertisement includes a coupon or a discount offer to the user.

10. The system of claim 1, wherein upon a first selection of the user comprises: upon a first selection of the user of the video advertisement.

11. The system of claim 1, wherein upon a first selection of the user comprises: upon a first selection of the user of an option to iconize the video advertisement for potential later presentation.

12. The system of claim 1, further comprising:
providing, to advertisers, one or more graphical user interfaces or application protocol interfaces (APIs), through which the advertisers can identify, select or configure video advertisements to be subject to iconization, and can identify, select or configure particular icons to represent particular video advertisements.

13. The system of claim 1, further comprising:
providing the user with one or more graphical user interfaces through which the user can configure parameters or options associated with iconization and play of video advertisements.

14. The system of claim 1, wherein the first display area comprises a set of icons limited to a specified maximum number and a specified maximum display area.

15. The system of claim 1, wherein, in an auction-based online advertising marketplace, advertisers bid for iconized or iconizable video advertisement serving or presentation opportunities as part of online advertising campaigns.

16. The system of claim 1, wherein the video advertisement and the icon are visibly related to a single advertiser, brand or product.

17. A method comprising:
during presentation of an online video to a user on a user device, initiating presentation of each video content item of a plurality of video content items to the user, wherein each video content item of the plurality of video content items includes at least one offer to the user;
for each video content item of a set of at least some of the plurality of video content items, after presentation of at least a portion of a duration of the video content item, the video content item including an offer, and upon a first selection of the user:
ceasing presentation of the video content item, including display of any portion thereof;
in a first display area outside of a display area of the online video, causing display of an icon, representing the video advertisement and provided or selected by an advertiser, in an icon spot among other displayed icons, representing other video advertisements, in other icon spots, wherein the display of the icon in an icon spot is based at least in part on one of a determined period for displaying the icon and a characteristic of the online video; and
causing storage of at least a portion of the video advertisement on the device of the user while the icon is displayed in an icon spot, and erasure of one or more of the set of video advertisements from storage on the device of the user when an associated icon is no longer displayed in one of the icon spots.

18. The method of claim 17, further comprising:
upon user selection of the icon and utilizing storage of the video advertisement on the device of the user, initiating a presentation that includes playing at least a portion of the video advertisement.

19. The method of claim 18, further comprising:
starting, as determined by the advertiser, the presentation from one of a point where the video advertisement left off playing before being iconized, a beginning of the video advertisement, or a beginning of an altered version of the video advertisement.

20. The method of claim 18, further comprising:
presenting at least a portion of the video advertisement, wherein the video advertisement includes a coupon or discount offer to the user.

21. The method of claim 17, further comprising:
targeting the video advertisement and the icon personally to the user based one more or more characteristics of the user.

22. The method of claim 17, further comprising:
utilizing an advertisement iconization engine for iconization of video advertisements.

23. The method of claim 17, further comprising:
upon the first selection of the user, causing storage of the video advertisement, in its entirety, on the user device.

24. A computer program product embedded in a non-transitory computer-readable medium having computer instructions stored thereon, which, when executed by a processor, cause the processor to perform one or more steps comprising:
during presentation of an online video to a user, for each video advertisement of a set of video advertisements presented, at least in part, to the user on a device of the user, after presentation of at least a portion of a duration of the video advertisement and upon a first selection of the user:
  ceasing presentation of the video advertisement, including display of any portion thereof;
  in a first display area substantially adjacent to a display area of the online video, causing display of an icon, representing the video advertisement and provided or selected by an advertiser, in an icon spot among other displayed icons, representing other video advertisements, in other icon spots, wherein the display of the icon in an icon spot is based at least in part on one of a determined period for displaying the icon and a characteristic of the online video;
  causing storage of at least a portion of the video advertisement on the device of the user while the icon is displayed in an icon spot, and erasure of one or more of the set of video advertisements from storage on the device of the user when an associated icon is no longer displayed in one of the icon spots; and
upon user selection of the icon and utilizing storage of the video advertisement on the device of the user, initiating a presentation that includes playing at least a portion of the video advertisement.

* * * * *